United States Patent [19]

Kraupa

[11] 4,028,176
[45] June 7, 1977

[54] NUCLEAR REACTOR INSTALLATION

[75] Inventor: Werner Kraupa, Erlangen, Germany

[73] Assignee: Siemens Aktiengesellschaft, Munich, Germany

[22] Filed: Sept. 5, 1974

[21] Appl. No.: 503,462

[30] Foreign Application Priority Data

Sept. 17, 1973 Germany .......................... 2346638

[52] U.S. Cl. .................................. 176/38; 176/87
[51] Int. Cl.² ...................................... G21C 9/00
[58] Field of Search ........... 176/37, 38, 87, DIG. 2; 138/36, 114, 115, 178; 285/133 R; 137/67

[56] References Cited

UNITED STATES PATENTS

| 3,087,514 | 4/1963 | Highsmith | 138/114 |
| 3,488,067 | 1/1970 | Sommer | 176/87 |
| 3,753,853 | 8/1975 | Schubert | 176/87 |
| 3,775,251 | 11/1973 | Schabert | 176/38 |
| 3,818,935 | 6/1974 | Karker et al. | 176/87 |

FOREIGN PATENTS OR APPLICATIONS 1,041,042  9/1966  United Kingdom ................. 176/87

Primary Examiner—Stephen C. Bentley
Assistant Examiner—S. A. Cangialosi
Attorney, Agent, or Firm—Kenyon & Kenyon Reilly Carr & Chapin

[57] ABSTRACT

A nuclear pressurized-water reactor installation includes a reactor pressure vessel, a concrete biological shield surrounding the vessel and a cylindrical pressurized coolant pipe extending from the vessel. The wall forms a hole of substantially larger diameter than the diameter of the coolant pipe and through which this pipe is extended with a cylindrical space therearound, and the wall forms at least one air space between the vessel and the wall and which is spanned by the pipe. If the pipe within the hole fails, its pressurized-water coolant which then escapes can flow through the cylindrical space into the air space and down and under the vessel to exert an upward force on the vessel. To prevent this, a cylindrical containment encircles the pipe in the hole and extends to the vessel with which the containment fluid-tightly seals, thus preventing coolant escaping from the pipe from having access to the air space around and beneath the bottom of the pressure vessel.

5 Claims, 3 Drawing Figures

NUCLEAR REACTOR INSTALLATION

BACKGROUND OF THE INVENTION

A conventional pressurized-water reactor installation includes a reactor pressure vessel containing the core, a concrete biological shield forming a cavity within which the vessel is positioned and forming a wall surrounding the vessel, and a cylindrical pressurized coolant pipe extending from the vessel. Actually, two and usually more of such coolant pipes are involved but only one need be considered here. The shield forms a wall surrounding the pressure vessel and forming a hole of substantially larger diameter than the diameter of the pipe and through which the pipe is extended with a cylindrical space therearound. The concrete wall also forms at least one air space, and possibly two or more, between the vessel and the concrete wall, and this space or these spaces are spanned by the pipe. At least one of the air spaces is provided so that air coolant can be circulated through the space around the vessel and out through the top of the space, to reduce the thermal load on the concrete, and the cylindrical space formed around the coolant pipe, by connection with the air space, receives some of the air coolant for reducing the thermal load on the concrete forming the hole through which the pipe passes.

The above involves the problem that if the coolant pipe carrying the pressurized-water coolant, fails inside of the hole, the pressurized coolant can discharge through the hole inwardly into the air space and get beneath the bottom of the pressure vessel in its cavity, the vessel then acting like a piston receiving an upward displacement force which its positioning means are not particularly designed to resist.

Therefore, there is the problem of keeping the escaped coolant, in the event of an improbable pipeline accident in the hole, from getting into the air space around the vessel and beneath the bottom of the vessel, while at the same time, during normal reactor operation, permitting the air coolant from the air space around the vessel, to have access to the cylindrical space around the coolant pipe for outward flow therethrough.

SUMMARY OF THE INVENTION

The object of the present invention is to solve the above problem.

This is done by providing a cylindrical containment enclosing the coolant pipe within the cylindrical space therearound and extending inwardly and spanning, with and around the pipe, the air space, and having an inner end sealed around the end of the pipe immediately extending from the vessel. In this way, accidentally escaping coolant is contained against getting into the air space, or spaces if there are more than one, and being forced to exhaust outwardly beyond the outside of the concrete shield's wall surrounding the vessel.

The cylindrical containment is axially slidable on the coolant pipe and, of course, forms a pressurized-coolant containment space around the pipe. The inner end of the containment, which is against the pressure vessel, has an inwardly extending flange having a peripheral edge which forms the seal at the pressure vessel end, the vessel forming, such as via its usual coolant nozzle, an annular seat on which the inner periphery of this flange seats to close the containment space from the previously mentioned air space. The inside of this flange forms an annular piston area receiving the pressure from escaping coolant and forcing the sealing arrangement into tighter sealing action, when required. On the other hand, the outside of the flange is exposed to the air space around the vessel, and if an accident occurs on the part of the vessel, producing an excessive pressure in this air space, the entire cylindrical containment slides away from the vessel, effecting unsealing and providing a pressure escape via the containment to the outside of the concrete biological shield wall.

The air space referred to above may be a dead-air space formed by insulation around the vessel and closed off at the top of the vessel, and the biological shield may in an improved arrangement provide a second outer space which is actively ventilated by flow of an air coolant while separated from the dead-air space, the two spaces being separated by biologically shielding concrete preventing radiation of the air coolant in the outer space.

In the above improved arrangement the second or ventilating air space is also spanned by the coolant pipe and the cylindrical containment. As previously indicated, it is desirable that a part of this air coolant should circulate around the coolant pipe between it and the concrete forming the hole through which this pipe passes.

Therefore, the cylindrical containment is made with a diameter which is, of course, larger than that of the coolant pipe but which is smaller than that of the hole through the concrete wall, thus leaving a portion of the cylindrical space surrounding the containment and through which the coolant may flow from the active or ventilating air space, around the outside of the cylindrical containment within the inside of the hole in the concrete wall of the biological shield. The inner or entrance end of the just-mentioned cylindrical space is provided with an annular ring forming a valve which can be adjusted to control the proportion of air coolant passed over the outside of the cylindrical containment to reduce the thermal load on the encircling concrete. This valve is made in the form of a check valve which opens to flow outwardly over the cylindrical containment but which snaps shut to reverse flow. The wall of the containment within the hole through the concrete is preferably made somewhat thin and possibly of less strength than required to resist the force of escaping pressurized-water coolant. However, if this portion of the containment should fail, in the event of a loss-of-coolant accident within the hole in the concrete wall, the valve just described snaps shut and prevents all or a major portion of the escaping coolant from flowing inwardly and into any of the spaces around the pressure vessel, the majority of the just escaping coolant then exhausting outwardly beyond the outside of the concrete wall in the manner previously described.

The annular valve ring receives a thrust stress towards the pressure vessel in the event of the above-described kind of accident. For this, and other reasons, the portion of the cylindrical containment which spans the air space or spaces around the vessel within the concrete wall of the biological shield, is made as a separate part of substantially increased wall thickness, relative to the balance of the containment, and is telescoped over this balance and welded to it at the inner end of the hole in the concrete wall, thus forming by its end edge a radial abutment and an annular abutment against which the annular ring check valve can abut to transmit the thrust through this thickened inner portion of the cylindrical containment spanning the air space or spaces.

It can be seen that the containment provides an adequate reaction to the force of escaping coolant under any circumstances, it being understood that the pressure vessel is normally firmly anchored against radial or horizontal displacement, the coolant pipe being largely self-supporting and having its inner end welded to the usual coolant nozzle of the pressure vessel.

The entire slidable cylindrical containment is spring-biased in the direction of the vessel to maintain its inner end normally sealed as previously described. However, the entire cylindrical containment can slide outwardly on the coolant pipe when necessary.

BRIEF DESCRIPTION OF THE DRAWINGS

The presently preferred mode for carrying out the invention is illustrated by the accompanying drawings, in which.

DETAILED DESCRIPTION OF THE INVENTION

Figure 1:
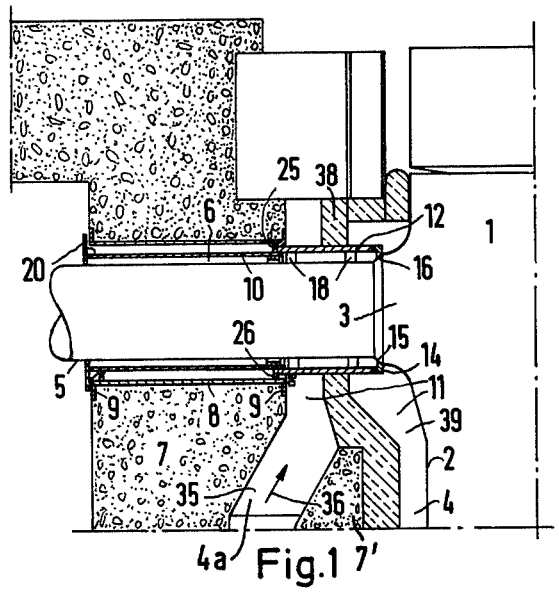
FIG. 1 is a vertical section showing only the installation components required to illustrate this invention.

Having reference to the above drawings, the pressure vessel 1, of course, made of steel, has an outside cylindrical wall surface 2, its upper portion having a series of circumferentially interspaced coolant nozzles of which one is shown at 3 in FIG. 1. A dead-air space 4 is formed around the wall outside 2 by a heat reflective layer 38 shaped to close this space 4 off at the top of the vessel, the space providing via dead-air a thermal insulation itself. The coolant pipe 5 is shown which connects with the nozzle 3 and extends outwardly therefrom to form a part of the usual main pressurized-water coolant loop. This pipe 5 extends horizontally from the vertical vessel 1 through a hole 6 formed in the main concrete wall 7 of the biological shield. An inner concrete biological shield wall 7', supports the layer 38 by being attached to the inside of this wall. It can be seen that in this installation there are two annular spaces 4 and 4a formed around the vessel 1 by concrete walls, both spaces being spanned by the pipe 5 so that without the present invention, a failure of the pipe 5 within the hole 6 can have access to both spaces, and since both spaces are provided by what are, in effect, cavities, upward forces can be created for which the various parts which receive these forces are not particularly designed to withstand.

The inside of the concrete 7 forming the pipe hole 6 is of substantially larger diameter than the diameter of the pipe 5, and this inside is lined with a liner 8 having end flanges 9 engaging the vertical surfaces of the concrete wall 7. This liner may be made of rigid material which is relatively thermally non-conductive.

Figure 2:
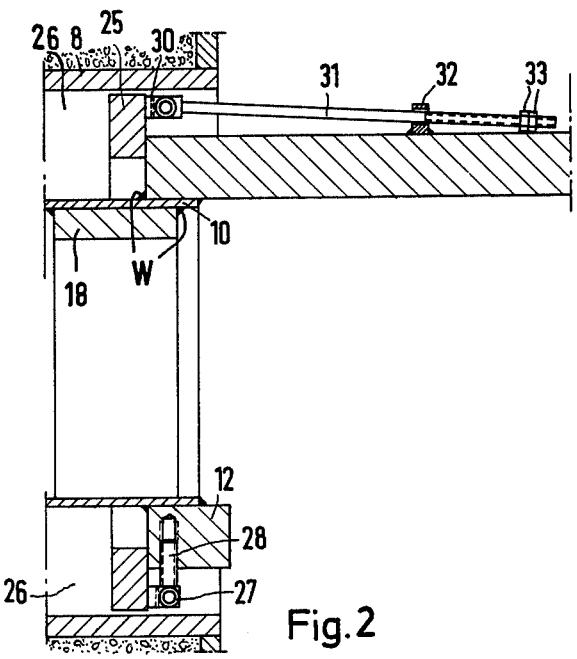
FIG. 2 is also a vertical section but on a very greatly enlarged scale showing the details which cannot be illustrated in FIG. 1 because of its much smaller scale.
Figure 3:
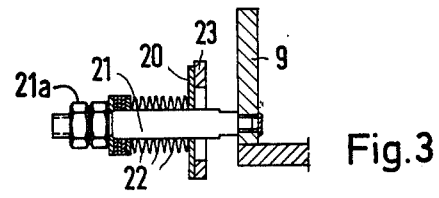
FIG. 3 is like FIG. 2 but shows a further detail.

The cylindrical containment is shown as comprising a section 10 which is wholly or mainly within the hole 6 and a section which spans the two gaps or spaces 11 formed by the upper portions of the annular spaces 4 and 4a, this spanning section being shown at 12, and as can be seen better in FIG. 2, having a wall thickness which is much greater than that of the section 10. For example, the section 12 may have a wall thickness about five times greater than the wall thickness of the section 10, the latter having a wall thickness adequate for structural strength but possibly not being resistant to the force that would be exerted by pressurized coolant escaping from the pipe 5 within the hole 6. As shown by FIG. 2, the stronger section 12a overlaps the section 10 and is welded to the latter by the welds W. At the inner end of the containment's section 12 there is an inwardly extending weld-on flange 14 having an annular periphery 15 beveled, as about at a 45° angle, to seat on a correspondingly beveled seat 16 formed by the coolant nozzle 3. The containment 10–12 is slidingly supported in an axial direction by circumferentially interspaced spacers 18 and the outer end of the section 10 of the containment has an outwardly extending flange 20, which as shown by FIG. 3, is inwardly biased towards the vessel and biasing the entire containment in that direction. This is done by a pin 21, the arrangement being described being one of a peripheral series, having adjusting nuts 21a providing a reaction to a compression spring 22 which applies inward force to the flange 20, maintaining the inner end of the containment seated and sealed as described.

In operation, a pipe failure releasing the pressurized coolant inside of the containment applies its pressure to the inside of the flange 14 so as to increase the sealing pressure, the thick cross section 12 containing the pressure completely and freeing the spaces 4 and 4a and, of course, the gaps 11, from this pressure. The outside of the flange 14 provides a piston area receiving excessive pressure in the space 4 should this develop because of a failure of the vessel wall 2, this thrusting the entire containment slidably outwardly or to the left so that the pressure can escape at the outer end of the containment outside of the wall 7.

The containment forms both an annular space around the pipe 5 and an annular space around itself between it and the liner 8 of the pipeline hole through the concrete 7. The inner end of the space between the containment and the liner opens into the space 4a to receive a portion of coolant air flowing upwardly through this space as indicated by the arrow 36. At the same time, this communication would permit the space 4a to receive escaped pressurized coolant in the event of an accident to the pipeline 5 within the hole 6, this problem prevailing even though the containment section 12 shields the space 4 from lost pressurized coolant no matter where the pipeline 5 should break.

To overcome the above problem, a flat annular ring 25 is provided for substantially closing this space 26 between the containment section 10 and the liner 8, this ring forming an annular valve pivotally conducted by a hinge pin 27 supported by a screw 18 screwed into hole in the thick-walled containment section 12, permitting the annular valve 25 to swing axially with respect to the containment section 10. At its top, this swinging valve ring 25 is pivoted by a pivot 30 to a tension rod 31 sliding in a stop or abutment, the swinging limit or opening action of the valve ring 25 being adjustable by means of adjustment nuts 33 at the end of the tension rod 31.

Under normal operation, the air coolant flowing upwardly through the space 4a can flow through the inner end of the annular space 26 surrounding the pipe section 10, so as to externally cool the latter and to avoid excessive thermal loading of the concrete 7 forming the hole 6. Release of pressurized coolant from the pipe 5, however, into the space 26, snaps this swinging valve 25 to the right and closed, the valve ring 25 abutting the end of the thick containment section 12 which carries the reaction back to the inner end of this section 12 seating against the relatively immovable seat provided by the coolant nozzle 3 and the pressure vessel 1 which is firmly positioned against radial or horizontal displacement. In this case also, the lost coolant escapes outwardly without gaining access to either of the spaces around the pressure vessel and particularly the space 4a which during normal operation is in communication with the space 26.

It would, of course, be possible to provide the swinging valve 25 with remote-control means which could be manually or automatically operated, providing the check valve effect or snap-closing action of the valve 25, in the event of a pipe accident, is not interfered with.

What is claimed is:

1. A nuclear reactor installation comprising a reactor pressure vessel, a concrete biological shield having a wall surrounding said vessel, and a cylindrical pressurized water coolant pipe extending from said vessel, said wall forming a hole of substantially larger diameter than the diameter of said pipe and through which the pipe is extended with a cylindrical space therearound, and the wall forming at least one air space between said vessel and the wall and which is spanned by the pipe; wherein the improvement comprises a cylindrical containment encircling said pipe and extending through said cylindrical space to and in contact with said vessel and having an open exhaust end at the outside of said wall, said tubular containment being axially slidable on said pipe and forming a pressurized coolant containment space around the pipe, said containment having an inner end and an inwardly extending flange on this inner end, said flange having an inner periphery and said vessel forming an annular seat on which the inner periphery of said flange seats to close said containment space from said air space.

2. The installation of claim 1 having means for elastically biasing said containment towards said vessel and permitting the containment to slide away from the vessel under the force of excessive pressure in said air space, said containment space exhausting to the outside of said wall.

3. The installation of claim 1 in which said containment has a portion spanning said air space forming said inner end and having a wall thickness substantially greater than the wall thickness of the balance of the containment.

4. The installation of claim 1 in which the concrete biological shield's said wall is formed by an inner wall and an outer wall and the aforesaid air space is formed between said inner wall and said vessel and an air coolant space is formed between said walls and an annular air coolant passage is formed between said cylindrical containment and the concrete forming said hole with said air coolant passage and said air coolant space being normally open to each other, and an annular ring check valve is positioned in said air coolant passage adjacent to said air coolant space, said valve being normally open to outward flow and closes to inward flow through said air coolant passage.

5. The installation of claim 4 in which said containment has a portion spanning both of said air spaces and forming the containment's said inner end and having a wall thickness substantially greater than the wall thickness of the balance of the containment, said portion forming an outward abutment for said ring valve when this valve closes.

* * * * *